UNITED STATES PATENT OFFICE 2,305,501

PROCESS OF PREPARING β-INDOLAL-HYDANTOIN

Marvin A. Spielman, Waukegan, Ill., assignor to Abbott Laboratories, North Chicago, Ill., a corporation of Illinois No Drawing. Application November 7, 1940, Serial No. 364,649

5 Claims. (Cl. 260—309)

The present invention is directed to an improved method of preparing β-indolalhydantoin, i. e., β-indolalhydantoin.

The compound β-indolalhydantoin is an important intermediate of particular interest in the pharmacological field. It may be treated, for example, with ammonium sulfide in accordance with known practices to give tryptophane, one of the essential amino acids. Tryptophane, as it cannot be synthesized inside the body, must be supplied thereto from the outside.

It has been proposed heretofore to synthesize the desired intermediate by various processes including the condensation of indole-3-aldehyde with hydantoin in the presence of sodium acetate and acetic anhydride. The prior processes, due to low yields, necessity of exacting reacting conditions, high costs, etc. have not been found satisfactory for the preparation of the β-indolalhydantoin compound.

The principal object of the present invention is to provide an improved method of preparing β-indolalhydantoin.

Other objects will be apparent as the description proceeds.

I have discovered an improved method of preparing the β-indolalhydantoin intermediate. This method consists generally in reacting indole-3-glyoxylic acid with hydantoin. The reaction ordinarily carried out in the presence of a condensing agent such as dimethylaniline, morpholine, nicotine, piperidine, etc., or various mixtures of the same, consists in condensing one molecule of indole-3-glyoxylic acid with one molecule of hydantoin with the liberation of one molecule of water and one molecule of carbon dioxide. The following formulae will illustrate the reaction scheme of the present invention:

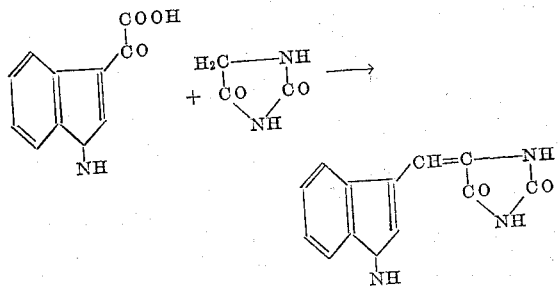

The following detailed process, while not to be interpreted as limiting, will serve to illustrate the present invention.

Example

About six grams of indole-3-glyoxylic acid were ground intimately with 4.5 g. of hydantoin and placed in a flask with 45 cc. of dimethylaniline and 1.5 cc. of morpholine. The flask was lowered into an oil bath pre-heated to 210° C. The contents turned to a purple, sticky mass as water and carbon dioxide were given off. At the end of seven minutes the color turned to brown as yellow crystals began to separate. The flask was then cooled, 50 cc. of methanol was added, and after one hour the product was separated by filtration and washed with methanol. The desired β-indolalhydantoin obtained melts with decomposition at about 320° C.

The indole-3-glyoxylic acid used in the above example may be obtained by reacting indole with oxalyl chloride followed by water in accordance with known practices. The conversion of the β-indolalhydantoin intermediate to the desired tryptophane may also be accomplished as indicated above by processes known to the art. Other condensing agents may be used in place of those listed above although mixtures of dimethylaniline and morpholine have been found to give particularly good results and are ordinarily preferred.

The process of the present invention provides the art with a relatively simple means for obtaining the desired valuable intermediate. The process also provides the necessary commercially practical yields and is free from the disadvantages found in prior processes suggested heretofore.

It will be understood by those skilled in the art that the present invention is not limited to the above illustrative example. All modifications coming within the scope of the present invention are intended to be covered by the following claims.

I claim:
1. The step in the process of preparing the β-indolalhydantoin compound of particular value as an intermediate in the preparation of an essential amino acid, which consists in condensing indole-3-glyoxylic acid with hydantoin.

2. The step in the proces of preparing β-indolalhydantoin of value as an intermediate in the preparation of tryptophane, which consists in reacting indole-3-glyoxylic acid with hydantoin in the presence of a condensing agent.

3. The process of preparing β-indolalhydantoin which comprises reacting indole-3-glyoxylic acid with hydantoin in the presence of dimethylaniline, said process consisting in condensing one molecule of indole-3-glyoxylic acid with one molecule of hydantoin with the liberation of one molecule of water and one molecule of carbon dioxide.

4. The process of preparing β-indolalhydantoin which comprises reacting indole-3-glyoxylic acid with hydantoin in the presence of morpholine, said process consisting in condensing one molecule of indole-3-glyoxylic acid with one molecule of hydantoin with the liberation of one molecule of water and one molecule of carbon dioxide.

5. The process of preparing β-indolalhydantoin which comprises reacting indole-3-hydan... acid with hydantoin in the presence of a basic mixture of dimethylaniline and morpholine, said process consisting in condensing one molecule of indole-3-glyoxylic acid with one molecule of hydantoin with the liberation of one molecule of water and one molecule of carbon dioxide.

MARVIN A. SPIELMAN.